(12) United States Patent
Kim et al.

(10) Patent No.: US 12,738,512 B2
(45) Date of Patent: Sep. 15, 2026

(54) FUEL CELL SYSTEM AND EXHAUST GAS TREATMENT DEVICE

(71) Applicants: HYUNDAI MOTOR COMPANY, Seoul (KR); KIA CORPORATION, Seoul (KR)

(72) Inventors: Min Jae Kim, Hwaseong-si (KR); Youn Kyou Kim, Busan (KR); Jung Hyun Shin, Busan (KR)

(73) Assignees: HYUNDAI MOTO COMPANY, Seoul (KR); KIA CORPORATION, Seoul (KR)

(*) Notice: Subject to any disclaimer, the term of this patent is extended or adjusted under 35 U.S.C. 154(b) by 597 days.

(21) Appl. No.: 18/207,661

(22) Filed: Jun. 8, 2023

(65) Prior Publication Data

US 2024/0194906 A1 Jun. 13, 2024

(30) Foreign Application Priority Data

Dec. 7, 2022 (KR) ........................ 10-2022-0169854

(51) Int. Cl.
*H01M 8/06* (2016.01)
*H01M 8/04119* (2016.01)
(Continued)

(52) U.S. Cl.
CPC ..... *H01M 8/04156* (2013.01); *H01M 8/0662* (2013.01); *H01M 2008/1095* (2013.01)

(58) Field of Classification Search
CPC ......... H01M 8/04156; H01M 8/04179; H01M 8/04119; H01M 8/04126; H01M 8/0662; H01M 2008/1095
See application file for complete search history.

(56) References Cited

U.S. PATENT DOCUMENTS 7,883,675 B2 * 2/2011 Nakamura ............ B01J 8/0469 422/219
8,668,377 B2 3/2014 Kitamura
(Continued)

FOREIGN PATENT DOCUMENTS

EP 2922126 A1 9/2015
JP 2006-059684 A 3/2006
(Continued)

OTHER PUBLICATIONS

Kim, Min Jae, "Designing an air mixer and a short exhaust system for decreasing hydrogen concentration," the 30th Hyundai Motor Company Group Conference.
(Continued)

*Primary Examiner* — Raymond Alejandro
(74) *Attorney, Agent, or Firm* — MCDONNELL BOEHNEN HULBERT & BERGHOFF LLP

(57) ABSTRACT

An exhaust gas treatment device including an outer housing including a first inflow part and a second inflow part, an inner housing provided in the outer housing and having a gas inflow part, a guide channel defined between the outer housing and the inner housing and configured to guide a part of the first exhaust gas to the gas inflow part, and a spiral member including a barrel part provided in the inner housing and configured to define a passage flow path, a spiral protrusion provided on an outer surface of the barrel part and configured to define a spiral flow path between the barrel part and the inner housing, and a gas discharge part provided in the barrel part and configured to discharge the first exhaust gas and the second exhaust gas, which have passed through the spiral flow path, to the passage flow path.

16 Claims, 8 Drawing Sheets

(51) Int. Cl.

| | |
|---|---|
| ***H01M 8/0662*** | (2016.01) |
| *H01M 8/10* | (2016.01) |

(56) References Cited

U.S. PATENT DOCUMENTS

| | | | | |
|---|---|---|---|---|
| 10,648,379 | B2 | 5/2020 | Na et al. | |
| 10,865,673 | B2 | 12/2020 | Na et al. | |
| 2003/0077488 | A1 | 4/2003 | Yamamoto et al. | |
| 2007/0053237 | A1 | 3/2007 | Yoshida et al. | |
| 2009/0282981 | A1 | 11/2009 | Kitamura | |
| 2015/0266052 | A1 | 9/2015 | Takagi | |
| 2018/0102560 | A1* | 4/2018 | Jung | F24F 8/167 |
| 2018/0171842 | A1 | 6/2018 | Na et al. | |
| 2020/0232358 | A1 | 7/2020 | Na et al. | |
| 2022/0367883 | A1 | 11/2022 | Ranganathan et al. | |
| 2023/0116637 | A1* | 4/2023 | Fenske | F01M 13/0011 55/309 |
| 2023/0238507 | A1 | 7/2023 | Bonhomme et al. | |
| 2023/0378501 | A1* | 11/2023 | Hammer | H01M 8/04843 |

FOREIGN PATENT DOCUMENTS

| | | | |
|---|---|---|---|
| KR | 10-0985142 | B1 | 10/2010 |
| KR | 1020180069619 | A | 6/2018 |
| KR | 2023-0137748 | A | 10/2023 |
| WO | 2022/136024 | A1 | 6/2022 |

OTHER PUBLICATIONS

European Search Report for EP Application No. 23177873, completed Nov. 5, 2024.

* cited by examiner

FUEL CELL SYSTEM AND EXHAUST GAS TREATMENT DEVICE

CROSS-REFERENCE TO RELATED APPLICATION

This application claims priority to and the benefit of Korean Patent Application No. 10-2022-0169854 filed in the Korean Intellectual Property Office on Dec. 7, 2022, the entire contents of which are incorporated herein by reference.

TECHNICAL FIELD

The present disclosure relates to a fuel cell system and an exhaust gas treatment device, and more particularly, to a fuel cell system and an exhaust gas treatment device, which are capable of reducing a hydrogen concentration in exhaust gas discharged from a fuel cell stack.

BACKGROUND

A fuel cell vehicle (e.g., a hydrogen fuel cell vehicle) is configured to autonomously generate electricity by means of a chemical reaction between fuel (hydrogen) and air (oxygen) and travel by operating a motor.

In general, the fuel cell vehicle may include a fuel cell stack configured to generate electricity by means of an oxidation-reduction reaction between hydrogen and oxygen, a fuel supply device configured to supply fuel (hydrogen) to the fuel cell stack, an air supply device configured to supply the fuel cell stack with air (oxygen) which is an oxidant required for an electrochemical reaction, and a thermal management system (TMS) configured to discharge heat, which is generated from the fuel cell stack and power electronic parts of the vehicle, to the outside of the system and control temperatures of the fuel cell stack and the power electronic parts.

Further, discharge water (condensate water) and exhaust gas (e.g., unreacted hydrogen), which are produced during the operation of the fuel cell stack, may be discharged to the outside through an exhaust pipe.

Meanwhile, a large amount of hydrogen may be contained in the exhaust gas discharged from the fuel cell stack (e.g., the exhaust gas discharged during a purge process for adjusting a hydrogen concentration in the fuel cell stack). When a hydrogen concentration in the exhaust gas increases to a certain level or higher, the risk of explosion increases. Accordingly, regulations are defined to force the hydrogen concentration in the exhaust gas to be at a predetermined level or lower.

In the related art, there has been proposed a solution for reducing the hydrogen concentration in the exhaust gas, which is discharged from the fuel cell stack, by mixing air and exhaust gas discharged from the fuel cell stack and discharging a mixture of the air and the exhaust gas.

It is necessary to sufficiently ensure a mixing space (route), in which air and exhaust gas are mixed, to sufficiently dilute the exhaust gas discharged from the fuel cell stack. In the related art, a mixing chamber having a large capacity needs to be used to effectively mix air and exhaust gas, which causes problems in that a structure is inevitably complicated, and a degree of design freedom and spatial utilization deteriorate.

Various studies have been conducted to simplify the structure while effectively reducing the hydrogen concentration in the exhaust gas discharged from the fuel cell stack, but the study results are still insufficient.

SUMMARY

The present disclosure has been made in an effort to provide a fuel cell system and an exhaust gas treatment device that are capable of reducing a hydrogen concentration in exhaust gas discharged from a fuel cell stack.

In particular, the present disclosure has been made in an effort to contribute to reducing a size of the device while reducing a hydrogen concentration in exhaust gas discharged from the fuel cell stack by effectively mixing cathode exhaust gas and anode exhaust gas.

The present disclosure has also been made in an effort to simplify a structure and improve spatial utilization and a degree of design freedom.

The present disclosure has also been made in an effort to improve safety and reliability.

The present disclosure has also been made in an effort to simplify a manufacturing process and reduce costs.

The present disclosure has also been made in an effort to ensure durability of the fuel cell stack and prolong a lifespan of the fuel cell stack.

The objects to be achieved by the below described embodiments are not limited to the above-mentioned objects, but also include objects or effects that may be understood from the solutions or embodiments described below.

An embodiment of the present disclosure provides an exhaust gas treatment device including an outer housing including a first inflow part into which first exhaust gas is introduced, and a second inflow part into which second exhaust gas is introduced, an inner housing provided in the outer housing and having a gas inflow part into which the first exhaust gas and the second exhaust gas are introduced, a guide channel defined between the outer housing and the inner housing and configured to guide a part of the first exhaust gas, which is introduced into the first inflow part, to the gas inflow part, and a spiral member including: a barrel part provided in the inner housing while communicating with the first inflow part and configured to define a passage flow path through which the first exhaust gas passes, a spiral protrusion provided on an outer surface of the barrel part and configured to define a spiral flow path between the barrel part and the inner housing so that the first exhaust gas and the second exhaust gas, which have passed through the gas inflow part, are mixed in the spiral flow path; and a gas discharge part provided in the barrel part and configured to discharge the first exhaust gas and the second exhaust gas, which have passed through the spiral flow path, to the passage flow path.

This is to simplify a structure while effectively reducing a hydrogen concentration in exhaust gas discharged from a fuel cell stack.

That is, it is necessary to sufficiently ensure a mixing space (route), in which air and exhaust gas are mixed, to sufficiently dilute the exhaust gas discharged from the fuel cell stack. In the related art, a mixing chamber having a large capacity needs to be used to effectively mix air and exhaust gas, which causes problems in that a structure is inevitably complicated, and a degree of design freedom and spatial utilization deteriorate.

However, in the embodiment of the present disclosure, the spiral flow path may be provided around the barrel part through which the first exhaust gas passes, and the first exhaust gas and the second exhaust gas may be mixed while flowing along the spiral flow path. Therefore, it is possible to obtain an advantageous effect of simplifying the structure while effectively reducing the hydrogen concentration in the exhaust gas discharged from the fuel cell stack.

In particular, in the embodiment of the present disclosure, the first exhaust gas and the second exhaust gas may be mixed while passing through the spiral flow path having a spiral shape and configured to surround a periphery of the barrel part, such that air and exhaust gas may be effectively mixed without using a separate mixing chamber having a large capacity. Therefore, it is possible to obtain an advantageous effect of further reducing the size of the exhaust gas treatment device, simplifying the structure, and improving a degree of design freedom and spatial utilization.

In particular, in the embodiment of the present disclosure, the spiral flow path having a spiral shape may be provided around the barrel part, which makes it possible to sufficiently ensure a mixing route for mixing the first exhaust gas and the second exhaust gas in a relatively narrow space (space between the barrel part and the inner housing). Therefore, it is possible to contribute to the size reduction of the exhaust gas treatment device while effectively reducing the hydrogen concentration in the exhaust gas discharged from the fuel cell.

According to the exemplary embodiment of the present disclosure, the second inflow part may include a plurality of branch flow paths configured to communicate with the guide channel.

The gas inflow part may have various structures into which the first exhaust gas and the second exhaust gas may be introduced.

For reference, in the embodiment of the present disclosure, the configuration in which the first exhaust gas and the second exhaust gas are introduced into the gas inflow part is defined as including both a case in which the first exhaust gas and the second exhaust gas are introduced into the gas inflow part in a state in which the first exhaust gas and the second exhaust gas are mixed and a case in which the first exhaust gas and the second exhaust gas are independently introduced into the gas inflow part.

According to the exemplary embodiment of the present disclosure, the gas inflow part may include a first gas inflow portion provided in the inner housing and configured to supply the first exhaust gas into the inner housing; and a second gas inflow portion provided in the inner housing, spaced apart from the first gas inflow portion, and configured to supply the second exhaust gas into the inner housing.

According to the exemplary embodiment of the present disclosure, the spiral protrusion may be provided continuously in a longitudinal direction of the barrel part.

The spiral flow path defined by the spiral protrusion may be variously changed in number in accordance with required conditions and design specifications.

According to the exemplary embodiment of the present disclosure, the spiral flow path may include a first spiral flow path provided to correspond to any one of the plurality of branch flow paths and configured to guide the first exhaust gas and the second exhaust gas, and a second spiral flow path provided to correspond to another of the plurality of branch flow paths and configured to guide the first exhaust gas and the second exhaust gas independently of the first spiral flow path.

As described above, in the embodiment of the present disclosure, the gas mixture flowing along the first spiral flow path may be discharged to the passage flow path first, and then the gas mixture flowing along the second spiral flow path may be discharged, at a time difference, to the passage flow path at a position spaced apart from an outlet end of the first spiral flow path. Therefore, it is possible to prevent the gas mixture (particularly, the second exhaust gas) from being discharged concentratedly at a particular position of the passage flow path. Therefore, it is possible to obtain an advantageous effect of more effectively diluting the second exhaust gas in the gas finally discharged via the passage flow path.

The gas discharge part may have various structures capable of discharging the first exhaust gas and the second exhaust gas, which have passed through the spiral flow path, to the passage flow path.

According to the exemplary embodiment of the present disclosure, the gas discharge part may include a plurality of gas discharge holes provided to be spaced apart from one another in the longitudinal direction of the barrel part.

According to the embodiment of the present disclosure, the first inflow part may be provided at one end of the outer housing, the gas inflow part may be provided adjacent to an end of the inner housing adjacent to the other end of the outer housing, and the gas discharge part may be provided to be closer to the first inflow part than the gas inflow part.

As described above, the gas inflow part may be provided adjacent to the end of the inner housing disposed adjacent to the other end of the outer housing, and the gas discharge part may be provided to be closer to the first inflow part than the gas inflow part. Therefore, it is possible to implement a maximally long movement route of the gas mixture (the gas mixture made by mixing the first exhaust gas and the second exhaust gas) flowing along the spiral flow path.

According to the exemplary embodiment of the present disclosure, the exhaust gas treatment device may include a condensate water discharge part configured to discharge condensate water, which is accommodated in the barrel part, to the guide channel.

This is based on the fact that a part of the condensate water contained in the second exhaust gas may be excessively introduced into the barrel part (the passage flow path) via the spiral flow path, and the excessive amount of condensate water introduced into the barrel part may degrade efficiency in mixing the gas mixture (the gas mixture made by mixing the first exhaust gas and the second exhaust gas) and the first exhaust gas and cause a breakdown of various types of devices. According to the embodiment of the present disclosure, because the condensate water accommodated in the barrel part is discharged to the guide channel through the condensate water discharge part, it is possible to obtain an advantageous effect of improving efficiency in mixing the gas mixture and the first exhaust gas and inhibiting the occurrence of breakdown.

The condensate water discharge part may have various structures capable of discharging the condensate water, which is accommodated in the barrel part, to the guide channel. According to the exemplary embodiment of the present disclosure, the condensate water discharge part may include a first condensate water discharge hole provided in the barrel part, and a second condensate water discharge hole provided in the inner housing while communicating with the first condensate water discharge hole.

According to the exemplary embodiment of the present disclosure, the exhaust gas treatment device may include a condensate water discharge line having one or a first end connected to the outer housing while communicating with the guide channel, and the other or a second end connected to the barrel part and disposed adjacent to a most downstream point of the passage flow path, the condensate water discharge line being configured to discharge condensate water, which is accommodated in the guide channel, to the passage flow path.

According to the exemplary embodiment of the present disclosure, the exhaust gas treatment device may include a first condensate water discharge port provided in the barrel part and configured to communicate with the passage flow path, and a second condensate water discharge port provided in the inner housing and configured to communicate with the first condensate water discharge port.

According to the exemplary embodiment of the present disclosure, the exhaust gas treatment device may include an impeller rotatably provided in the barrel part.

As described above, in the embodiment of the present disclosure, the impeller may be provided in the barrel part, and a turbulent flow may be generated in the barrel part by the impeller. Therefore, it is possible to obtain an advantageous effect of further improving the efficiency in mixing the first exhaust gas and the gas mixture (the gas mixture made by mixing the first exhaust gas and the second exhaust gas).

According to the exemplary embodiment of the present disclosure, the exhaust gas treatment device may include a guide cap provided on the inner housing to cover at least a part of the gas inflow part, the guide cap being configured to change movement routes of the first exhaust gas and the second exhaust gas flowing from the guide channel to the gas inflow part.

The guide cap may have various structures each having a guide flow path capable of changing the routes along which the first exhaust gas and the second exhaust gas introduced into the guide channel are introduced into the gas inflow part.

According to the exemplary embodiment of the present disclosure, the guide cap may be configured to continuously surround the periphery of the barrel part.

As described above, in the embodiment of the present disclosure, the guide cap may be provided to cover the gas inflow part, and the guide cap may change the movement routes of the first exhaust gas and the second exhaust gas flowing from the guide channel to the gas inflow part, such that the movement routes of the first exhaust gas and the second exhaust gas may be implemented to be longer and more complicated. Therefore, it is possible to obtain an advantageous effect of more uniformly mixing the first exhaust gas and the second exhaust gas.

According to the exemplary embodiment of the present disclosure, the exhaust gas treatment device may include a reverse flow prevention part provided in the guide channel and configured to prevent a reverse flow of the first exhaust gas.

The reverse flow prevention part may have various structures capable of preventing the reverse flow of the first exhaust gas (or the second exhaust gas).

According to the exemplary embodiment of the present disclosure, the reverse flow prevention part may include a first plate member provided on an outer surface of the inner housing and inclined while facing the gas inflow part, and a second plate member connected to an end of the first plate member, which is adjacent to the first inflow part, and inclined while facing the gas inflow part, and the first plate member and the second plate member may collectively define a reverse flow prevention surface.

Another embodiment of the present disclosure provides a fuel cell system including a fuel cell stack including a cathode and an anode, an outer housing including a first inflow part into which first exhaust gas discharged from the cathode is introduced, and a second inflow part into which second exhaust gas discharged from the anode is introduced, an inner housing provided in the outer housing and having a gas inflow part into which the first exhaust gas and the second exhaust gas are introduced, a guide channel defined between the outer housing and the inner housing and configured to guide a part of the first exhaust gas, which is introduced into the first inflow part, to the gas inflow part and a spiral member including a barrel part provided in the inner housing while communicating with the first inflow part and configured to define a passage flow path through which the first exhaust gas passes, a spiral protrusion provided on an outer surface of the barrel part and configured to define a spiral flow path between the barrel part and the inner housing so that the first exhaust gas and the second exhaust gas, which have passed through the gas inflow part, are mixed in the spiral flow path, and a gas discharge part provided in the barrel part and configured to discharge the first exhaust gas and the second exhaust gas, which have passed through the spiral flow path, to the passage flow path.

According to the exemplary embodiment of the present disclosure, the spiral protrusion may be provided continuously in a longitudinal direction of the barrel part.

According to the exemplary embodiment of the present disclosure, the first inflow part may be provided at one end of the outer housing, the gas inflow part may be provided adjacent to an end of the inner housing adjacent to the other end of the outer housing, and the gas discharge part may be provided to be closer to the first inflow part than the gas inflow part.

DETAILED DESCRIPTION

Figure 1:
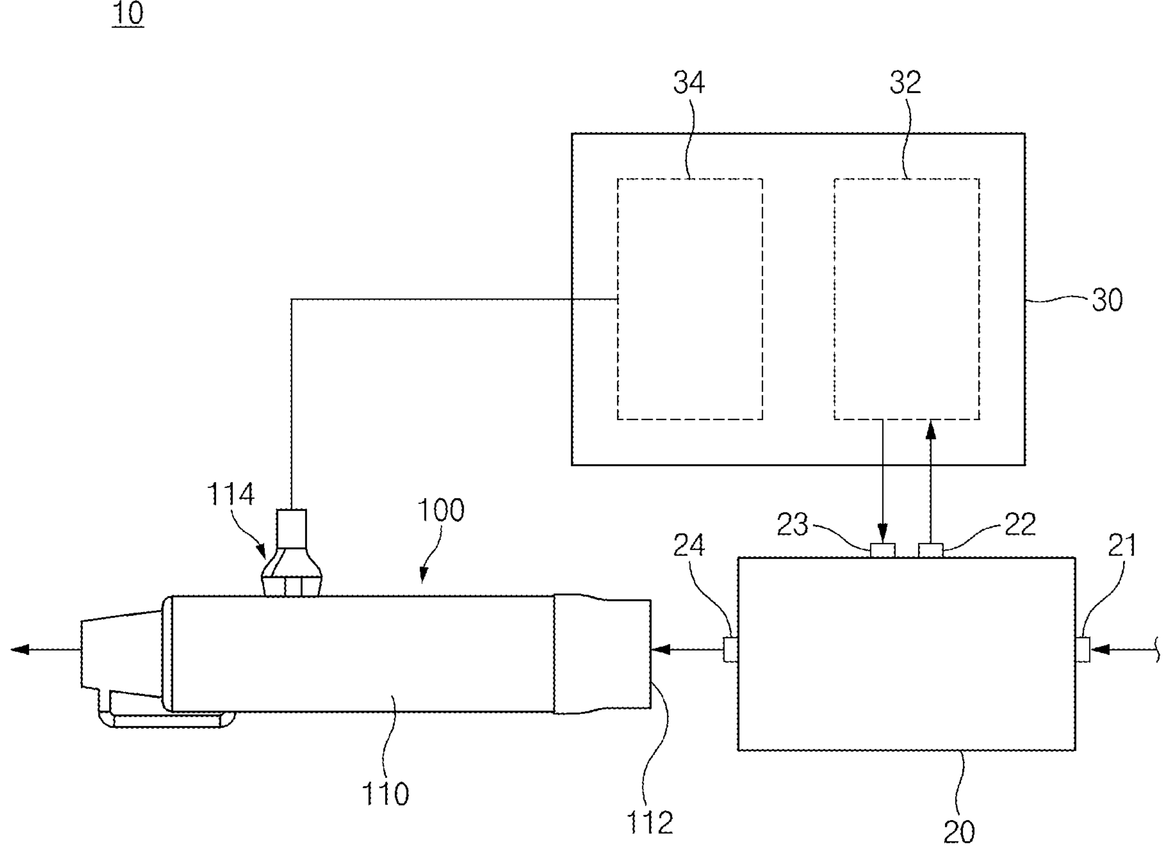
FIG. 1 is a view illustrating a fuel cell system according to an embodiment of the present disclosure.
Figure 2:
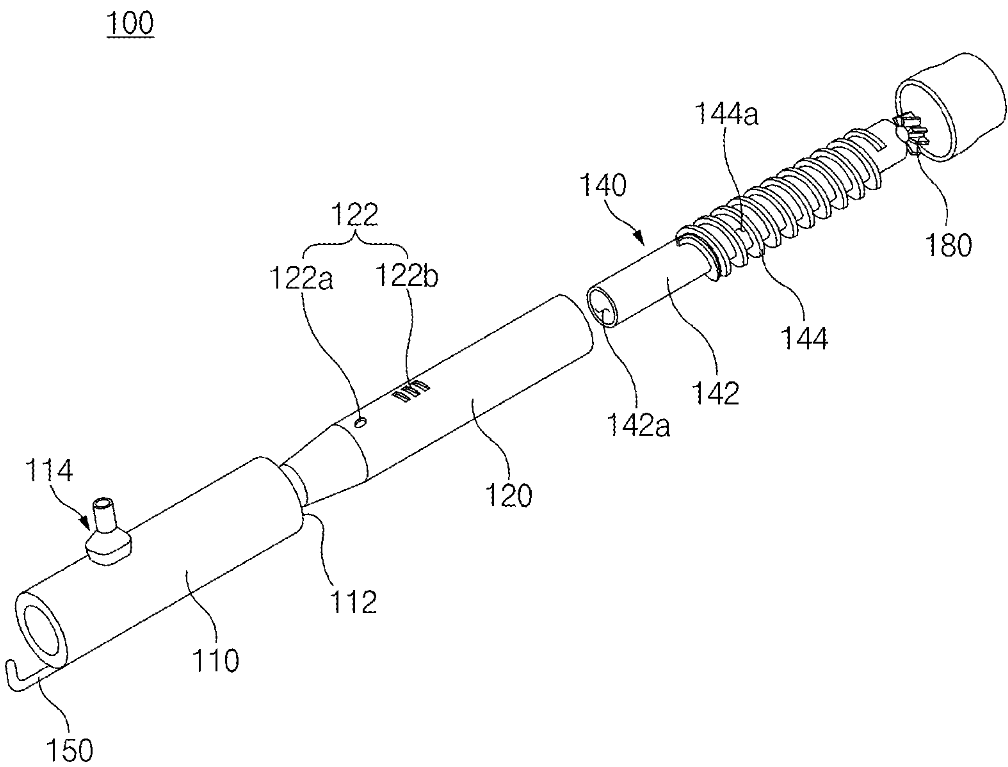
FIG. 2 is a view illustrating an exhaust gas treatment device according to the embodiment of FIG. 1 of the present disclosure.
Figure 3:
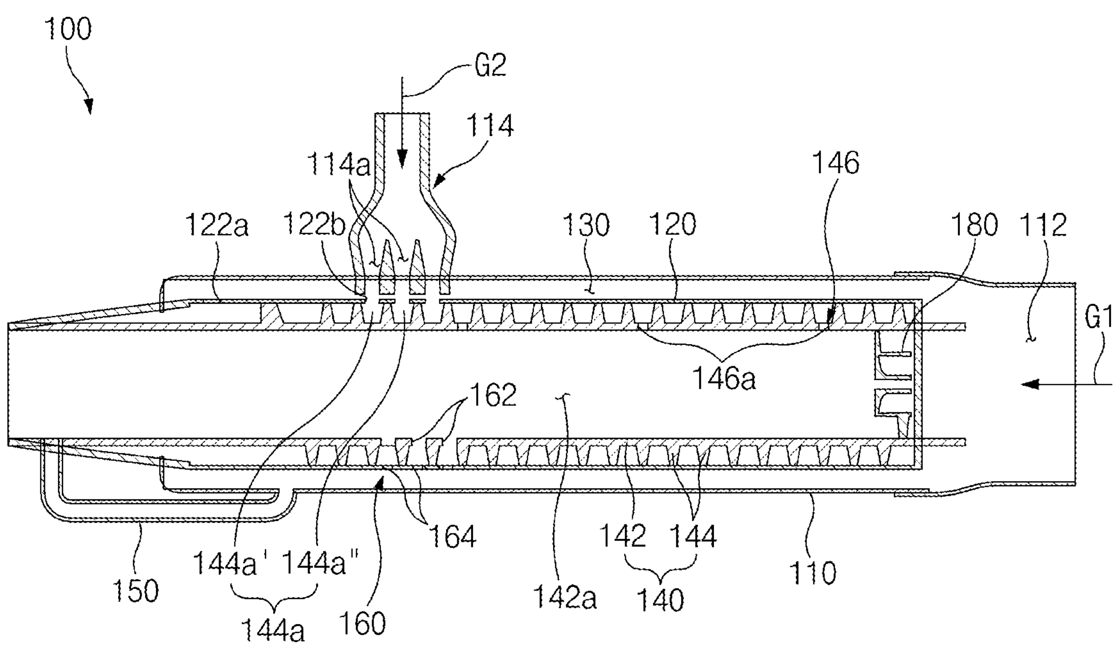
FIG. 3 is a cross-sectional view illustrating the exhaust gas treatment device according to the embodiment of FIG. 2 of the present disclosure.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 8, an exhaust gas treatment device 100 according to an embodiment of the present disclosure includes an outer housing 110 having a first inflow part 112 into which first exhaust gas G1 is introduced, and a second inflow part 114 into which second exhaust gas G2 is introduced, an inner housing 120 provided in the outer housing 110 and having a gas inflow part 122 into which the first exhaust gas G1 and the second exhaust gas G2 are introduced, a guide channel 130 defined between the outer housing 110 and the inner housing 120 and configured to guide a part of the first exhaust gas G1, which is introduced into the first inflow part 112, to the gas inflow part 122, and a spiral member 140 including a barrel part 142 provided in the inner housing 120 while communicating with the first inflow part 112 and configured to define a passage flow path 142*a* through which the first exhaust gas G1 passes, a spiral protrusion 144 provided on an outer surface of the barrel part 142 and configured to define a spiral flow path 144*a* between the barrel part 142 and the inner housing 120 so that the first exhaust gas G1 and the second exhaust gas G2, which have passed through the gas inflow part 122, are mixed in the spiral flow path 144*a*, and a gas discharge part 146 provided in the barrel part 142 and configured to discharge the first exhaust gas G1 and the second exhaust gas G2, which have passed through the spiral flow path 144*a*, to the passage flow path 142*a*.

For reference, the exhaust gas treatment device 100 according to an embodiment of the present disclosure may be used to treat (dilute) various types of exhaust gas in accordance with required conditions and design specifications. The present disclosure is not restricted or limited by the type and properties of the exhaust gas.

For example, the exhaust gas treatment device 100 according to an embodiment of the present disclosure may be used to dilute exhaust gas (e.g., hydrogen) discharged from a fuel cell system 10 applied to mobility vehicles such as automobiles, ships, and airplanes.

According to the exemplary embodiment of the present disclosure, the fuel cell system 10 may include a fuel cell stack 30 including a cathode 32 and an anode 34, the outer housing 110 having the first inflow part 112 into which the first exhaust gas G1 discharged from the cathode 32 is introduced, and the second inflow part 114 into which the second exhaust gas G2 discharged from the anode 34 is introduced, the inner housing 120 provided in the outer housing 110 and having the gas inflow part 122 into which the first exhaust gas G1 and the second exhaust gas G2 are introduced, the guide channel 130 defined between the outer housing 110 and the inner housing 120 and configured to guide a part of the first exhaust gas G1, which is introduced into the first inflow part 112, to the gas inflow part 122, and the spiral member 140 including: the barrel part 142 provided in the inner housing 120 while communicating with the first inflow part 112 and configured to define the passage flow path 142*a* through which the first exhaust gas G1 passes; the spiral protrusion 144 provided on the outer surface of the barrel part 142 and configured to define the spiral flow path 144*a* between the barrel part 142 and the inner housing 120 so that the first exhaust gas G1 and the second exhaust gas G2, which have passed through the gas inflow part 122, are mixed in the spiral flow path 144*a*, and the gas discharge part 146 provided in the barrel part 142 and configured to discharge the first exhaust gas G1 and the second exhaust gas G2, which have passed through the spiral flow path 144*a*, to the passage flow path 142*a*.

The fuel cell stack 30 refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include a membrane electrode assembly (MEA) (not illustrated) having catalyst electrode layers in which electrochemical reactions occur and which are attached to two opposite sides of an electrolyte membrane through which hydrogen ions move, a gas diffusion layer (GDL) (not illustrated) configured to uniformly distribute reactant gases and transfer generated electrical energy, a gasket (not illustrated) and a fastener (not illustrated) configured to maintain leakproof sealability for the reactant gases and a coolant and maintain an appropriate fastening pressure, and a separator (bipolar plate) (not illustrated) configured to move the reactant gases and the coolant.

More specifically, in the fuel cell, hydrogen, which is fuel, and air (oxygen), which is an oxidant, are supplied to the anode 34 and the cathode 32 of the membrane electrode assembly, respectively, through flow paths in the separator, such that the hydrogen is supplied to the anode 34, and the air is supplied to the cathode 32.

The hydrogen supplied to the anode 34 is decomposed into hydrogen ions (protons) and electrons by catalysts in the electrode layers provided at two opposite sides of the electrolyte membrane. Only the hydrogen ions are selectively transmitted to the cathode 32 through the electrolyte membrane, which is a cation exchange membrane, and at the same time, the electrons are transmitted to the cathode 32 through the gas diffusion layer and the separator which are conductors.

At the cathode 32, the hydrogen ions supplied through the electrolyte membrane and the electrons transmitted through the separator meet oxygen in the air supplied to the cathode 32 by an air supply device, thereby creating a reaction of producing water. As a result of the movement of the hydrogen ions, the electrons flow through external conductive wires, and the electric current is generated as a result of the flow of the electrons.

Meanwhile, the electrolyte membrane of the membrane electrode assembly needs to be maintained at a predetermined humidity or higher so that the fuel cell stack 30 normally operates.

To this end, air supplied along an air supply line (not illustrated) may pass through a humidifier 20, and air to be supplied to the fuel cell stack 30 along the air supply line may be humidified while passing through the humidifier 20. In this case, the humidification of air is defined as a process of increasing the humidity of the air.

For example, the humidifier 20 may be configured to humidify air (to humidify dry air) to be supplied to the fuel cell stack 30 using air (moist air) discharged from the fuel cell stack 30.

The humidifier 20 may have various structures capable of humidifying the dry air using the air (moist air) discharged from the fuel cell stack 30. The present disclosure is not restricted or limited by the structure of the humidifier 20.

According to the exemplary embodiment of the present disclosure, the humidifier 20 may be disposed between an air compressor (not illustrated) and the fuel cell stack 30. The humidifier 20 may include an inflow gas supply port (21) through which inflow gas (dry air) is introduced (supplied), an inflow gas discharge port (22) through which the (humidified) inflow gas having passed through the interior of the humidifier 20 is discharged, a moist air supply port (23) through which moist air discharged from the fuel cell stack 30 is supplied, and a moist air discharge port (24) through which the moist air, which has humidified the inflow gas, is discharged to the outside.

The inflow gas supplied through the inflow gas supply port may be humidified by the moist air while passing through a humidification membrane (e.g., a hollow fiber membrane) (not illustrated) disposed in the humidifier 20. Then, the humidified inflow gas may be supplied to the fuel cell stack 30 through the inflow gas discharge port.

Further, the moist air (or the condensate water) discharged from the fuel cell stack 30 may be supplied to the moist air supply port, humidify the inflow gas in the humidifier 20, and then be discharged to the outside through the moist air discharge port.

Referring to FIGS. 1 to 4, the exhaust gas treatment device 100 includes the outer housing 110, the inner housing 120, the guide channel 130, and the spiral member 140 and serves to reduce a hydrogen concentration in the exhaust gas discharged from the fuel cell stack 30.

The outer housing 110 includes the first inflow part 112 into which the first exhaust gas G1 (e.g., air) discharged from the cathode 32 is introduced, and the second inflow part 114 into which the second exhaust gas G2 (e.g., hydrogen) discharged from the anode 34 is introduced.

For example, the first exhaust gas G1 discharged from the cathode 32 of the fuel cell stack 30 may be introduced into the first inflow part 112 via the humidifier. The second exhaust gas G2 discharged from the anode 34 of the fuel cell stack 30 may be introduced into the second inflow part 114 along a discharge line (not illustrated).

The outer housing 110 may have various structures having the first inflow part 112 and the second inflow part 114. The present disclosure is not restricted or limited by the structure and shape of the outer housing 110.

For example, the outer housing 110 may have an approximately hollow cylindrical shape. The first inflow part 112 may be provided at one end (a right end based on FIG. 2) of the outer housing 110. The second inflow part 114 may be provided adjacent to the other end of the outer housing 110.

The first inflow part 112 may have various structures and shapes into which the first exhaust gas G1 (e.g., air) may be introduced. The present disclosure is not restricted or limited by the structure and shape of the first inflow part 112.

For example, the first inflow part 112 may be provided at an end (a right end based on FIG. 3) of the outer housing 110 based on a longitudinal direction of the outer housing 110. The first exhaust gas G1 discharged from the cathode 32 may be introduced in the longitudinal direction of the outer housing 110 via the first inflow part 112.

According to another embodiment of the present disclosure, the first inflow part may be provided at a lateral side of the outer housing or other positions.

The second inflow part 114 may have various structures and shapes into which the second exhaust gas G2 (e.g., hydrogen discharged during a purge process) may be introduced. The present disclosure is not restricted or limited by the structure and shape of the second inflow part 114.

For example, the second inflow part 114 may be provided at a lateral side of the outer housing 110. The second exhaust gas G2 discharged from the anode 34 may be introduced in a direction perpendicular to the longitudinal direction of the outer housing 110 via the second inflow part 114.

According to the exemplary embodiment of the present disclosure, the second inflow part 114 may include a plurality of (e.g., three) branch flow paths 114*a* that communicates with the guide channel 130. The second exhaust gas G2 introduced into the second inflow part 114 may be introduced into the outer housing 110 by being divided by the branch flow paths 114*a*.

In the embodiment of the present disclosure, the example is described in which the second inflow part 114 includes the three branch flow paths 114*a*. However, according to another embodiment of the present disclosure, the second inflow part may include two or fewer branch flow paths or four or more branch flow paths.

The inner housing 120 is provided in the outer housing 110 and has the gas inflow part 122 into which the first exhaust gas G1 and the second exhaust gas G2 are introduced.

The inner housing 120 may have various structures having the gas inflow part 122. The present disclosure is not restricted or limited by the structure of the inner housing 120.

For example, the inner housing 120 may have an approximately hollow cylindrical shape having a smaller diameter than the outer housing 110. For example, the inner housing 120 may be coaxially disposed in the outer housing 110.

The gas inflow part 122 may have various structures into which the first exhaust gas G1 and the second exhaust gas G2 may be introduced. The present disclosure is not restricted or limited by the structure and shape of the gas inflow part 122.

For reference, in the embodiment of the present disclosure, the configuration in which the first exhaust gas G1 and the second exhaust gas G2 are introduced into the gas inflow part 122 is defined as including both a case in which the first exhaust gas G1 and the second exhaust gas G2 are introduced into the gas inflow part 122 in a state in which the first exhaust gas G1 and the second exhaust gas G2 are mixed and a case in which the first exhaust gas G1 and the second exhaust gas G2 are independently introduced into the gas inflow part 122.

According to the exemplary embodiment of the present disclosure, the gas inflow part 122 may include a first gas inflow portion 122*a* provided in the inner housing 120 and configured to supply the first exhaust gas G1 into the inner housing 120 (the spiral flow path), and a second gas inflow portion 122*b* provided in the inner housing 120, spaced apart from the first gas inflow portion 122*a*, and configured to supply the second exhaust gas G2 into the inner housing 120 (the spiral flow path).

For example, the first gas inflow portion 122*a* and the second gas inflow portion 122*b* may each be provided in the form of a hole formed through a wall surface of the inner housing 120.

The guide channel 130 is defined between the outer housing 110 and the inner housing 120 and configured to guide a part of the first exhaust gas G1, which is introduced into the first inflow part 112, to the gas inflow part 122.

That is, the guide channel 130 may be defined as a space defined between an inner surface of the outer housing 110 and an outer surface of the inner housing 120. A part of the first exhaust gas G1 introduced into the first inflow part 112 may be supplied to the gas inflow part 122 (e.g., the first gas inflow portion) through the guide channel 130.

The spiral member 140 is provided in the inner housing 120 and configured to mix and discharge the first exhaust gas G1 and the second exhaust gas G2.

More specifically, the spiral member 140 includes: the barrel part 142 provided in the inner housing 120 while communicating with the first inflow part 112 and configured to define the passage flow path 142*a* through which the first exhaust gas G1 passes; the spiral protrusion 144 provided on the outer surface of the barrel part 142 and configured to define the spiral flow path 144*a* between the barrel part 142 and the inner housing 120 so that the first exhaust gas G1 and the second exhaust gas G2, which have passed through the gas inflow part 122, are mixed in the spiral flow path 144*a*, and the gas discharge part 146 provided in the barrel part 142 and configured to discharge the first exhaust gas G1 and the second exhaust gas G2, which have passed through the spiral flow path 144*a*, to the passage flow path 142*a*.

For example, the barrel part 142 may have an approximately hollow cylindrical shape having a smaller diameter than the inner housing 120. The passage flow path 142*a* may be defined in the barrel part 142, and the first exhaust gas G1 introduced through the first inflow part 112 may pass through the passage flow path 142*a*. For example, the barrel part 142 may be coaxially disposed in the inner housing 120. An outlet end of the barrel part 142 may have a cross-sectional area (e.g., a diameter) smaller than that of an inlet end of the barrel part 142.

The spiral protrusion 144 may be provided on the outer surface of the barrel part 142 and have an approximately spiral shape. The spiral protrusion 144 may define the spiral flow path 144*a* having a spiral shape between the outer surface of the barrel part 142 and an inner surface of the inner housing 120 so that the first exhaust gas G1 and the second exhaust gas G2, which have passed through the gas inflow part 122, are mixed in the spiral flow path 144*a*.

In particular, to ensure a sufficient section in which the first exhaust gas G1 and the second exhaust gas G2 are mixed, the spiral protrusion 144 may be continuously provided in a longitudinal direction of the barrel part 142, and the spiral flow path 144*a* may be continuously defined in the longitudinal direction of the barrel part 142.

The spiral flow path 144*a* defined by the spiral protrusion 144 may be variously changed in number in accordance with required conditions and design specifications. The present disclosure is not restricted or limited by the number of the spiral flow paths 144*a*.

According to the exemplary embodiment of the present disclosure, the spiral flow path 144*a* may include a first spiral flow path 144*a*' provided to correspond to any one of the plurality of branch flow paths 114*a* and configured to guide the first exhaust gas G1 and the second exhaust gas G2, and a second spiral flow path 144*a*" provided to correspond to another of the plurality of branch flow paths 114*a* and configured to guide the first exhaust gas G1 and the second exhaust gas G2 independently of the first spiral flow path 144*a*'.

For example, the first spiral flow path 144*a*' and the second spiral flow path 144*a*" may have different lengths (lengths in the longitudinal direction of the barrel part). Hereinafter, an example will be described in which the second spiral flow path 144*a*" has a longer length than the first spiral flow path 144*a*'.

Because the second spiral flow path 144*a*" has a longer length than the first spiral flow path 144*a*', an outlet end of the second spiral flow path 144*a*" may be disposed to be spaced apart from an outlet end of the first spiral flow path 144*a*' (disposed adjacent to the first inflow part).

As described above, in the embodiment of the present disclosure, the gas mixture flowing along the first spiral flow path 144*a*' may be discharged to the passage flow path 142*a* first, and then the gas mixture flowing along the second spiral flow path 144*a*" may be discharged, at a time difference, to the passage flow path 142*a* at a position spaced apart from the outlet end of the first spiral flow path 144*a*'. Therefore, it is possible to prevent the gas mixture (particularly, the second exhaust gas) from being discharged concentratedly at a particular position of the passage flow path 142*a*. Therefore, it is possible to obtain an advantageous effect of more effectively diluting the second exhaust gas G2 (reducing the hydrogen concentration) in the gas finally discharged via the passage flow path 142*a*.

The gas discharge part 146 is provided in the barrel part 142 and configured to discharge the first exhaust gas G1 and the second exhaust gas G2, which have passed through the spiral flow path 144*a*, to the passage flow path 142*a*.

That is, a gas mixture (the gas mixture made by mixing the first exhaust gas and the second exhaust gas) G3 flowing through the spiral flow path 144*a* may be introduced into the passage flow path 142*a* through the gas discharge part 146 and then discharged to the outside together with the first exhaust gas G1 passing through the passage flow path 142*a*.

The gas discharge part 146 may have various structures capable of discharging the first exhaust gas G1 and the second exhaust gas G2, which have passed through the spiral flow path 144*a*, to the passage flow path 142*a*. The present disclosure is not restricted or limited by the structure of the gas discharge part 146.

According to the exemplary embodiment of the present disclosure, the gas discharge part 146 may include a plurality of gas discharge holes 146*a* provided to be spaced apart from one another in the longitudinal direction of the barrel part 142. For example, the gas discharge hole 146*a* may be provided in the form of a hole formed through a wall surface of the barrel part 142 while corresponding to the outlet end of each of the spiral flow paths 144*a* (e.g., the first spiral flow path and the second spiral flow path).

According to another embodiment of the present disclosure, the gas discharge part may include only the single gas discharge hole.

According to the exemplary embodiment of the present disclosure, the first inflow part 112 may be provided at one end (the right end based on FIG. 3) of the outer housing 110, and the gas inflow part 122 may be provided adjacent to an end (a left end based on FIG. 3) of the inner housing 120 disposed adjacent to the other end of the outer housing 110. The gas discharge part 146 may be provided to be closer to the first inflow part 112 than the gas inflow part 122 (disposed at a right side based on FIG. 3).

As described above, the gas inflow part 122 may be provided adjacent to the end (the left end based on FIG. 3) of the inner housing 120 disposed adjacent to the other end of the outer housing 110, and the gas discharge part 146 may be provided to be closer to the first inflow part 112 than the gas inflow part 122. Therefore, it is possible to implement a maximally long movement route of the gas mixture (the gas mixture made by mixing the first exhaust gas and the second exhaust gas) G3 flowing along the spiral flow path 144*a*.

Figure 4:
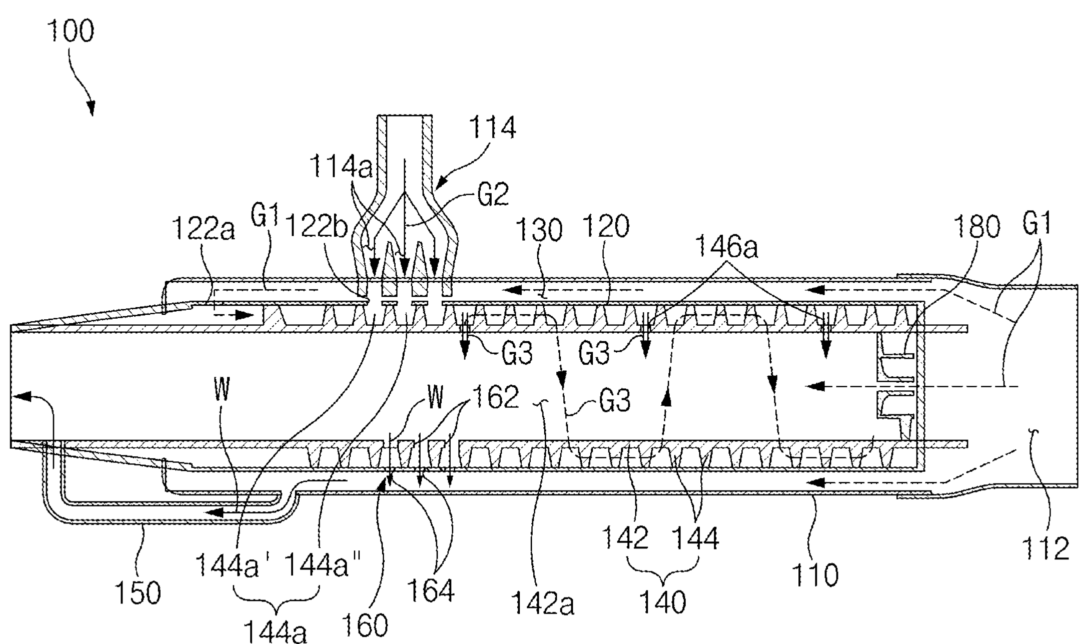
FIG. 4 is a view illustrating movement routes of first exhaust gas and second exhaust gas in the exhaust gas treatment device according to the embodiment of FIG. 1 of the present disclosure.

Referring to FIG. 4, a part of the first exhaust gas G1 (e.g., air) introduced through the first inflow part 112 may be discharged along the passage flow path 142*a*. The remaining part of the first exhaust gas G1 introduced through the first inflow part 112 may flow along the guide channel 130 and then be supplied to the spiral flow path 144*a* via the gas inflow part 122.

In addition, the second exhaust gas G2 (e.g., hydrogen) introduced through the second inflow part 114 may be supplied to the spiral flow path 144*a* via the gas inflow part 122.

The first exhaust gas G1 and the second exhaust gas G2 supplied to the spiral flow path 144*a* may be mixed while flowing along the spiral flow path 144*a* and discharged to the passage flow path 142*a* via the gas discharge part 146. The gas mixture G3 discharged to the passage flow path 142*a* may be mixed again with the first exhaust gas G1 passing through the passage flow path 142*a* and then finally discharged to the outside.

As described above, in the embodiment of the present disclosure, the first exhaust gas G1 discharged from the cathode 32 and the second exhaust gas G2 discharged from the anode 34 may be mixed in the exhaust gas treatment device 100 and then discharged. Therefore, it is possible to obtain an advantageous effect of reducing the hydrogen concentration in the exhaust gas discharged from the fuel cell stack 30 and reducing a risk of explosion.

Among other things, in an embodiment of the present disclosure, the first exhaust gas G1 and the second exhaust gas G2 may be mixed while passing through the spiral flow path 144*a* having a spiral shape and configured to surround a periphery of the barrel part 142, such that air and exhaust gas may be effectively mixed without using a separate mixing chamber having a large capacity. Therefore, it is possible to obtain an advantageous effect of further reducing the size of the exhaust gas treatment device 100, simplifying the structure, and improving a degree of design freedom and spatial utilization.

According to the exemplary embodiment of the present disclosure, the outer housing 110 and the inner housing 120 may collectively define the guide channel 130 and serve as a kind of condensate water chamber for storing condensate water.

That is, condensate water may be contained in the second exhaust gas G2 discharged from the anode 34 (or the first exhaust gas discharged from the cathode). The condensate water contained in the second exhaust gas G2 may be introduced through the second inflow part 114 and then accommodated in the space (the guide channel) between the outer housing 110 and the inner housing 120.

As described above, in the embodiment of the present disclosure, the condensate water contained in the second exhaust gas G2 may be accommodated in the space (the guide channel) between the outer housing 110 and the inner housing 120. Therefore, it is possible to obtain an advantageous effect of minimizing a situation in which the spiral flow path 144*a* is clogged by the condensate water. Further, it is possible to obtain an advantageous effect of ensuring smooth flows of the first exhaust gas G1 and the second exhaust gas G2 passing through the spiral flow path 144*a*.

According to the exemplary embodiment of the present disclosure, the fuel cell system 10 may include a condensate water discharge part 160 configured to discharge the condensate water, which is accommodated in the barrel part 142, to the guide channel 130.

This is based on the fact that a part of the condensate water contained in the second exhaust gas G2 may be excessively introduced into the barrel part 142 (the passage flow path) via the spiral flow path 144*a*, and the excessive amount of condensate water introduced into the barrel part 142 may degrade efficiency in mixing the gas mixture (the gas mixture made by mixing the first exhaust gas and the second exhaust gas) G3 and the first exhaust gas G1 and cause a breakdown of various types of devices. According to the embodiment of the present disclosure, because the condensate water accommodated in the barrel part 142 is discharged to the guide channel 130 through the condensate water discharge part 160, it is possible to obtain an advantageous effect of improving efficiency in mixing the gas mixture and the first exhaust gas G1 and inhibiting the occurrence of breakdown.

The condensate water discharge part 160 may have various structures capable of discharging the condensate water, which is accommodated in the barrel part 142, to the guide channel 130. The present disclosure is not restricted or limited by the structure of the condensate water discharge part 160.

According to the exemplary embodiment of the present disclosure, the condensate water discharge part 160 may include a first condensate water discharge hole 162 provided in the barrel part 142, and a second condensate water discharge hole 164 provided in the inner housing 120 and configured to communicate with the first condensate water discharge hole 162. The condensate water accommodated in the barrel part 142 may sequentially pass through the first condensate water discharge hole 162 and the second condensate water discharge hole 164 and then be discharged to the guide channel 130.

According to another embodiment of the present disclosure, the condensate water accommodated in the barrel part may be discharged to the guide channel without passing through the interior of the inner housing.

In addition, according to the exemplary embodiment of the present disclosure, the fuel cell system 10 may include a condensate water discharge line 150 having one end connected to the outer housing 110 while communicating with the guide channel 130, and the other end connected to the barrel part 142 and disposed adjacent to a most downstream point of the passage flow path 142*a*, the condensate water discharge line 150 being configured to discharge the condensate water, which is accommodated in the guide channel 130, to the passage flow path 142*a*.

The condensate water discharge line 150 may have various structures capable of discharging the condensate water, which is accommodated in the guide channel 130, to the most downstream point of the passage flow path 142*a*. The present disclosure is not restricted or limited by the structure and shape of the condensate water discharge line 150.

For example, the condensate water discharge line 150 may have an approximately "U" shape and discharge the condensate water to the most downstream point of the passage flow path 142*a* at which the efficiency in mixing the gas mixture and the first exhaust gas G1 is not hindered.

According to the exemplary embodiment of the present disclosure, the fuel cell system 10 may include an impeller 180 rotatably provided in the barrel part 142.

Various types of impellers capable of forcibly moving the first exhaust gas G1 and the gas mixture G3 passing through the interior of the barrel part 142 may be used as the impeller 180. The present disclosure is not restricted or limited by the type of the impeller 180 and the number of impellers 180.

As described above, in the embodiment of the present disclosure, the impeller 180 may be provided in the barrel part 142, and the impeller 180 may forcibly move the first exhaust gas G1 and the gas mixture G3, such that a turbulent flow may be generated in the barrel part 142 by the impeller 180. Therefore, it is possible to obtain an advantageous effect of further improving the efficiency in mixing the first exhaust gas G1 and the gas mixture G3.

In the embodiment of the present disclosure illustrated and described above, the example is described in which only the single impeller 180 is provided in the barrel part 142. However, according to another embodiment of the present disclosure, two or more impellers may be provided in the barrel part.

Meanwhile, in the embodiment of the present disclosure illustrated and described above, the example has been described in which the first exhaust gas G1 and the second exhaust gas G2 introduced into the outer housing 110 through the first inflow part 112 and the second inflow part 114 are independently supplied to the spiral flow path 144*a*. However, according to another embodiment of the present disclosure, the first exhaust gas G1 and the second exhaust gas G2 introduced into the outer housing 110 through the first inflow part 112 and the second inflow part 114 may be supplied to the spiral flow path 144*a* in a state in which the first exhaust gas G1 and the second exhaust gas G2 are mixed.

Referring to FIGS. 5 to 8, according to another exemplary embodiment of the present disclosure, the fuel cell system 10 may include the fuel cell stack 30, the outer housing 110, the inner housing 120, the guide channel 130, and the spiral member 140, and the inner housing 120 may include only the single gas inflow part 122 into which the first exhaust gas G1 and the second exhaust gas G2 are together introduced. Therefore, the first exhaust gas G1 and the second exhaust gas G2 introduced into the outer housing 110 through the first inflow part 112 and the second inflow part 114 may be mixed while flowing along the guide channel 130 and then supplied to the spiral flow path 144*a* through the gas inflow part 122.

In addition, in the embodiment of the present disclosure illustrated and described above, the example has been described in which the spiral protrusion 144 defines the plurality of spiral flow paths 144*a*. However, according to another embodiment of the present disclosure, the spiral protrusion 144 may define only the single spiral flow path 144*a*.

According to the exemplary embodiment of the present disclosure, the fuel cell system 10 may include a sealing member (not illustrated) interposed between the inner housing 120 and the barrel part 142.

The sealing member may have various structures capable of sealing a gap between the inner housing 120 and the barrel part 142. The present disclosure is not restricted or limited by the structure of the sealing member.

For example, the sealing member may have an approximately ring shape and be interposed between the inner housing 120 and the barrel part 142.

The sealing member may be made of an elastic material such as silicone or urethane. The present disclosure is not restricted or limited by the material and properties of the sealing member.

According to another exemplary embodiment of the present disclosure, the fuel cell system 10 may include a guide cap 124 provided on the inner housing 120 to cover at least a part of the gas inflow part 122, and the guide cap 124 changes the movement routes of the first exhaust gas G1 and the second exhaust gas G2 flowing from the guide channel 130 to the gas inflow part 122.

The guide cap 124 may have various structures each having a guide flow path capable of changing the routes along which the first exhaust gas G1 and the second exhaust gas G2 introduced into the guide channel 130 are introduced into the gas inflow part 122. The present disclosure is not restricted or limited by the structure and shape of the guide cap 124.

For reference, in the embodiment of the present disclosure, the guide flow path of the guide cap 124 may be understood as an empty space defined along the interior of the guide cap 124.

For example, the guide flow path may be defined to be approximately parallel to the outer surface of the inner housing 120. Alternatively, the guide flow path may have a curved shape or other shapes.

According to the exemplary embodiment of the present disclosure, the guide cap 124 may have a continuous ring shape continuously surrounding the periphery of the barrel part 142 in a circumferential direction of the barrel part 142. According to another embodiment of the present disclosure, the guide cap may be configured to partially surround a periphery of the gas inflow part.

As described above, in the embodiment of the present disclosure, the guide cap 124 may be configured to cover the gas inflow part 122, and the guide cap 124 may change the movement routes of the first exhaust gas G1 and the second exhaust gas G2 flowing from the guide channel 130 to the gas inflow part 122 (e.g., the guide cap 124 allows the first exhaust gas G1 and the second exhaust gas G2 to move along an approximately S-shaped movement route), such that the movement routes of the first exhaust gas G1 and the second exhaust gas G2 may be implemented to be longer and more complicated. Therefore, it is possible to obtain an advantageous effect of more uniformly mixing the first exhaust gas G1 and the second exhaust gas G2.

Figure 5:
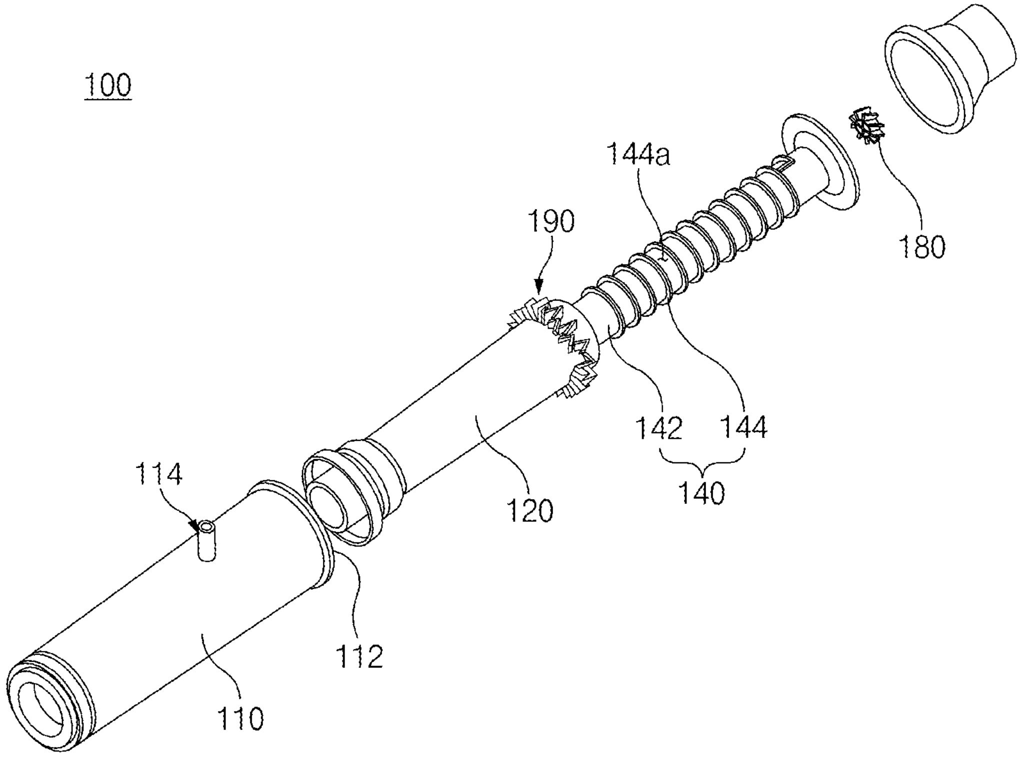
FIG. 5 is a view illustrating an exhaust gas treatment device according to another embodiment of the present disclosure.
Figure 7:
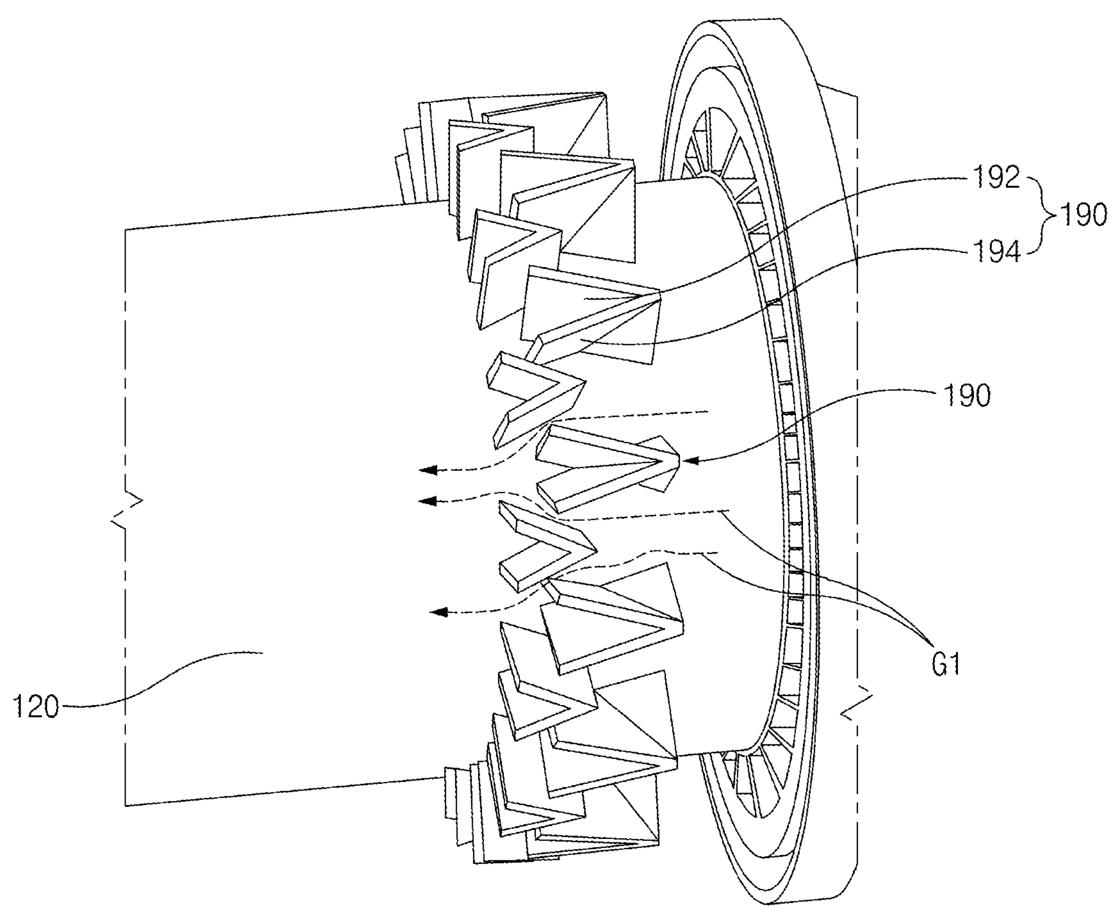
FIG. 7 is a view illustrating a reverse flow prevention part of the exhaust gas treatment device according to another embodiment of the present disclosure.

Referring to FIGS. 5 and 7, according to the exemplary embodiment of the present disclosure, the fuel cell system 10 may include reverse flow prevention parts 190 provided in the guide channel 130 and configured to prevent a reverse flow of the first exhaust gas G1.

The reverse flow prevention part 190 serves to prevent the first exhaust gas G1 (or the second exhaust gas) introduced into the guide channel 130 from flowing reversely to the first inflow part 112 while ensuring a smooth flow of the first exhaust gas G1 introduced into the outer housing 110 through the first inflow part 112 (a smooth flow of the first exhaust gas G1 from the first inflow part to a gas supply part).

The reverse flow prevention part 190 may have various structures capable of preventing the reverse flow of the first exhaust gas G1 (or the second exhaust gas). The present disclosure is not restricted or limited by the structure of the reverse flow prevention part 190.

According to the exemplary embodiment of the present disclosure, the reverse flow prevention part 190 may include a first plate member 192 provided on the outer surface of the inner housing 120 and inclined while facing the gas inflow part 122, and a second plate member 194 connected to an end of the first plate member, which is adjacent to the first inflow part 112, and inclined while facing the gas inflow part 122. The first plate member 192 and the second plate member 194 may collectively define a reverse flow prevention surface.

For example, the first plate member 192 and the second plate member 194 may define an approximate "V" shape having the reverse flow prevention surface facing the gas inflow part 122.

In the embodiment of the present disclosure illustrated and described above, the example has been described in which the reverse flow prevention parts 190 are provided on the outer surface of the inner housing 120. However, according to another embodiment of the present disclosure, the reverse flow prevention part may be provided on the inner surface of the outer housing.

In particular, the reverse flow prevention part 190 may be provided at an inlet end of the guide channel 130 adjacent to the first inflow part 112. Alternatively, the reverse flow prevention part 190 may be provided on a central portion of the guide channel 130 or other positions.

Meanwhile, in the embodiment of the present disclosure illustrated and described above, the example has been described in which the condensate water remaining in the guide channel 130 is discharged to the passage flow path 142*a* via the condensate water discharge line 150. However, according to another embodiment of the present disclosure, the condensate water remaining in the guide channel 130 may be discharged to the passage flow path 142*a* without separately passing through the condensate water discharge line 150.

Figure 6:
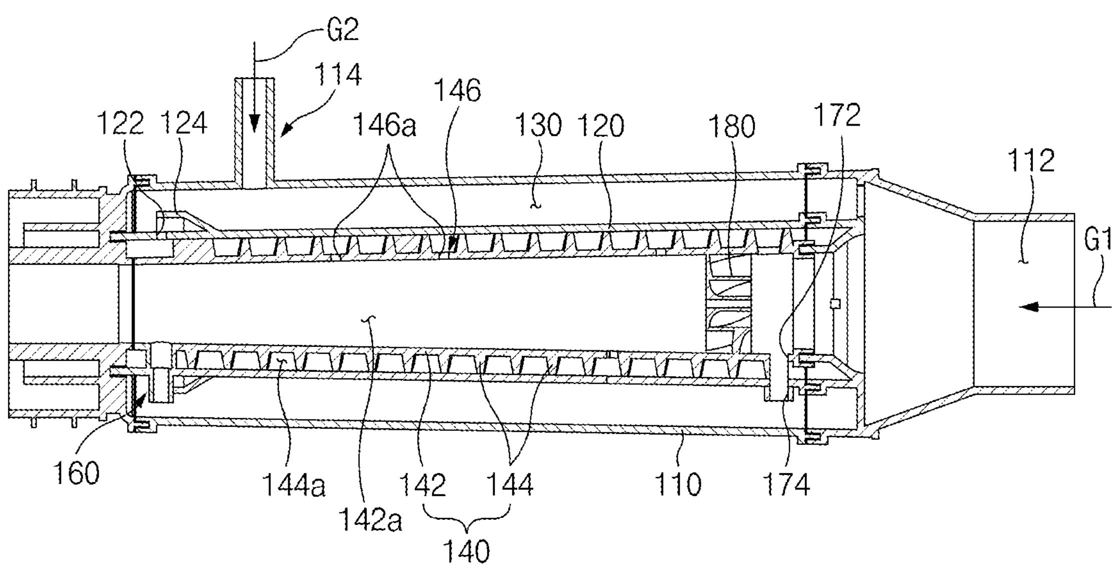
FIG. 6 is a cross-sectional view illustrating the exhaust gas treatment device according to another embodiment of the present disclosure.
Figure 8:
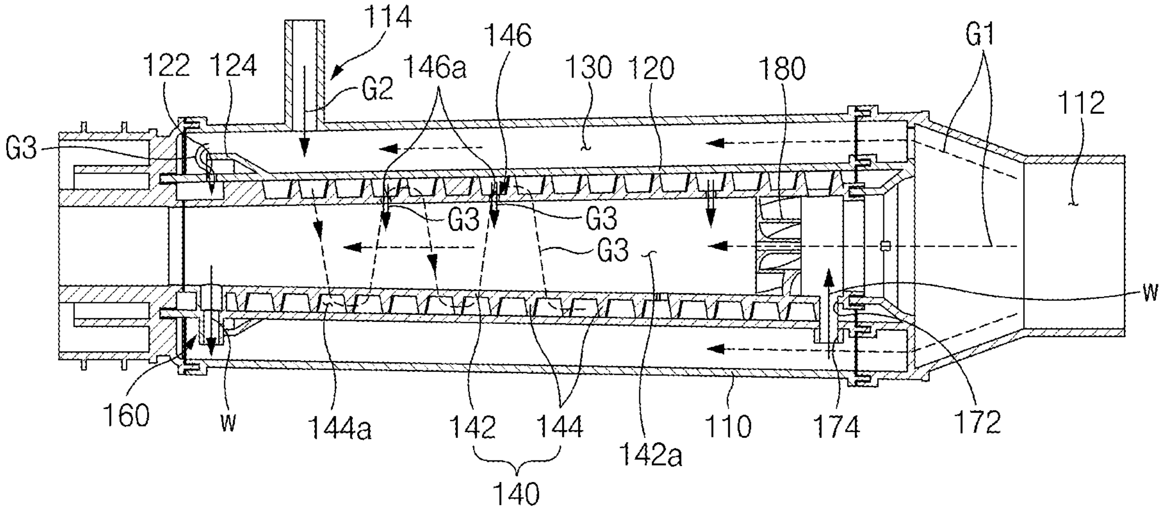
FIG. 8 is a view illustrating movement routes of first exhaust gas and second exhaust gas in the exhaust gas treatment device according to another embodiment of the present disclosure.

That is, referring to FIGS. 6 and 8, according to the exemplary embodiment of the present disclosure, the fuel cell system 10 may include a first condensate water discharge port 172 provided in the barrel part 142 and configured to communicate with the passage flow path 142*a*, and a second condensate water discharge port 174 provided in the inner housing 120 and configured to communicate with the first condensate water discharge port 172. The condensate water remaining in the guide channel 130 may be discharged to the passage flow path 142*a* via the second condensate water discharge port 174 and the first condensate water discharge port 172.

The first condensate water discharge port 172 and the second condensate water discharge port 174 may have various structures capable of collectively defining a condensate water discharge passageway capable of discharging the condensate water. The present disclosure is not restricted or limited by the structures and shapes of the first condensate water discharge port 172 and the second condensate water discharge port 174. For example, the first condensate water discharge port 172 and the second condensate water discharge port 174 may be provided in the form of circular holes having diameters corresponding to each other.

With the above-mentioned structure, the condensate water, which remains in the guide channel 130, and the condensate water, which is discharged to the guide channel 130 from the interior of the barrel part 142 through the condensate water discharge part 160, may be discharged to the passage flow path 142*a* again via the first condensate water discharge port 172 and the second condensate water discharge port 174.

As described above, according to the embodiment of the present disclosure, it is possible to obtain an advantageous effect of reducing the hydrogen concentration in the exhaust gas discharged from the fuel cell stack.

In particular, according to the embodiment of the present disclosure, it is possible to obtain an advantageous effect of contributing to reducing the size of the device while reducing the hydrogen concentration in the exhaust gas discharged from the fuel cell stack by effectively mixing the cathode exhaust gas and the anode exhaust gas.

In addition, according to the embodiment of the present disclosure, it is possible to obtain an advantageous effect of simplifying the structure and improving the spatial utilization and the degree of design freedom.

In addition, according to the embodiment of the present disclosure, it is possible to obtain an advantageous effect of improving the safety and reliability.

In addition, according to the embodiment of the present disclosure, it is possible to obtain an advantageous effect of simplifying the manufacturing process and reducing the costs.

In addition, according to the embodiment of the present disclosure, it is possible to obtain an advantageous effect of ensuring the durability of the fuel cell and prolonging the lifespan of the fuel cell.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. An exhaust gas treatment device comprising:

an outer housing including a first inflow part into which first exhaust gas is introduced, and a second inflow part into which second exhaust gas is introduced;

an inner housing provided in the outer housing and having a gas inflow part into which the first exhaust gas and the second exhaust gas are introduced;

a guide channel defined between the outer housing and the inner housing and configured to guide a part of the first exhaust gas, which is introduced into the first inflow part to the gas inflow part; and a spiral member including:

a barrel part provided in the inner housing while communicating with the first inflow part and configured to define a passage flow path through which the first exhaust gas passes;

a spiral protrusion provided on an outer surface of the barrel part and configured to define a spiral flow path between the barrel part and the inner housing such that the first exhaust gas and the second exhaust gas, which have passed through the gas inflow part, are mixed in the spiral flow path; and a gas discharge part provided in the barrel part and configured to discharge the first exhaust gas and the second exhaust gas, which have passed through the spiral flow path, to the passage flow path.

2. The exhaust gas treatment device of claim 1, wherein the spiral protrusion is provided continuously in a longitudinal direction of the barrel part.

3. The exhaust gas treatment device of claim 1, wherein the first inflow part is provided at one end of the outer housing, the gas inflow part is provided adjacent to an end of the inner housing, and the gas discharge part is provided to be closer to the first inflow part than the gas inflow part, wherein the end of the inner housing is provided adjacent to the other end of the outer housing.

4. The exhaust gas treatment device of claim 1, wherein the second inflow part comprises a plurality of branch flow paths configured to communicate with the guide channel.

5. The exhaust gas treatment device of claim 4, wherein the spiral flow path comprises:

a first spiral flow path provided to correspond to any one of the plurality of branch flow paths and configured to guide the first exhaust gas and the second exhaust gas; and a second spiral flow path provided to correspond to another of the plurality of branch flow paths and configured to guide the first exhaust gas and the second exhaust gas independently of the first spiral flow path.

6. The exhaust gas treatment device of claim 1, wherein the gas discharge part comprises a plurality of gas discharge holes provided to be spaced apart from one another in a longitudinal direction of the barrel part.

7. The exhaust gas treatment device of claim 1, wherein the gas inflow part comprises:

a first gas inflow portion provided in the inner housing and configured to supply the first exhaust gas to the spiral flow path; and a second gas inflow portion provided in the inner housing, spaced apart from the first gas inflow portion, and configured to supply the second exhaust gas to the spiral flow path.

8. The exhaust gas treatment device of claim 1, comprising:

a condensate water discharge part configured to discharge condensate water, which is accommodated in the barrel part, to the guide channel.

9. The exhaust gas treatment device of claim 8, wherein the condensate water discharge part comprises:

a first condensate water discharge hole provided in the barrel part; and a second condensate water discharge hole provided in the inner housing and configured to communicate with the first condensate water discharge hole.

10. The exhaust gas treatment device of claim 1, comprising:

a condensate water discharge line having one end connected to the outer housing and configured to communicate with the guide channel, and the other end connected to the barrel part and disposed adjacent to a most downstream point of the passage flow path, the condensate water discharge line being configured to discharge condensate water, which is accommodated in the guide channel, to the passage flow path.

11. The exhaust gas treatment device of claim 1, comprising:

a first condensate water discharge port provided in the barrel part and configured to communicate with the passage flow path; and a second condensate water discharge port provided in the inner housing and configured to communicate with the first condensate water discharge port.

12. The exhaust gas treatment device of claim 1, comprising:

an impeller rotatably provided in the barrel part.

13. The exhaust gas treatment device of claim 1, comprising:

a guide cap provided on the inner housing to cover at least a part of the gas inflow part, the guide cap being configured to change movement routes of the first exhaust gas and the second exhaust gas flowing from the guide channel to the gas inflow part.

14. The exhaust gas treatment device of claim 13, wherein the guide cap is configured to continuously surround a periphery of the barrel part.

15. The exhaust gas treatment device of claim 1, comprising:

a reverse flow prevention part provided in the guide channel and configured to prevent a reverse flow of the first exhaust gas.

16. The exhaust gas treatment device of claim 15, wherein the reverse flow prevention part comprises:

a first plate member provided on an outer surface of the inner housing and inclined while facing the gas inflow part; and a second plate member connected to an end of the first plate member, which is adjacent to the first inflow part, and inclined while facing the gas inflow part, and wherein the first plate member and the second plate member collectively define a reverse flow prevention surface.

* * * * *